United States Patent [19]

DeGroat et al.

[11] Patent Number: 5,277,584
[45] Date of Patent: Jan. 11, 1994

[54] VEHICLE VIBRATION SIMULATOR AND METHOD FOR PROGRAMMING AND USING SAME

[75] Inventors: Douglas E. DeGroat, Pine; Patricia M. McKenna, Lakewood, both of Colo.

[73] Assignee: Occusym Limited Liability Company, Denver, Colo.

[21] Appl. No.: 756,052

[22] Filed: Sep. 6, 1991

[51] Int. Cl.⁵ .......................... G09B 9/02; G09B 9/052
[52] U.S. Cl. ........................................ 434/29; 434/62; 434/64; 434/65; 434/67; 434/71; 128/739; 128/774
[58] Field of Search ........................ 434/29, 45, 46, 55, 434/58, 62, 64, 65, 66, 67, 71; 128/739, 740, 774, 781, 782; 73/865.1, 865.4, 865.6, 662, 663, 665, 666, 669

[56] References Cited

U.S. PATENT DOCUMENTS

| | | |
|---|---|---|
| 2,177,501 | 10/1939 | Smalley . |
| 2,269,444 | 1/1942 | Durham et al. . |
| 2,273,091 | 2/1942 | DeSilva . |
| 2,979,831 | 4/1961 | Bullock . |
| 3,478,442 | 11/1969 | Jazbutis et al. . |
| 3,537,191 | 11/1970 | Kazuo Aso . |
| 3,936,955 | 2/1976 | Gruen et al. . |
| 4,057,911 | 11/1977 | Sack ................................ 434/64 |
| 4,251,931 | 2/1981 | McKechnie . |
| 4,337,050 | 6/1982 | Engalitcheff, Jr. ................ 434/62 |
| 4,464,117 | 8/1984 | Foerst . |
| 4,478,407 | 10/1984 | Manabe ............................ 434/58 |
| 4,500,868 | 2/1985 | Tokitsu et al. ................... 434/65 |
| 4,750,888 | 6/1988 | Allard et al. . |
| 5,044,956 | 9/1991 | Behensky et al. ................ 434/71 |
| 5,051,094 | 9/1991 | Richter et al. ................... 434/35 |

FOREIGN PATENT DOCUMENTS

| | | | |
|---|---|---|---|
| 2658939 | 8/1991 | France ............................ 434/71 |
| 0033889 | 2/1991 | Japan ............................. 434/62 |
| 1320834 | 6/1987 | U.S.S.R. ........................ 434/71 |
| 1466718 | 3/1989 | U.S.S.R. ........................ 128/774 |
| 1487857 | 6/1989 | U.S.S.R. ........................ 128/774 |
| 1508265 | 9/1989 | U.S.S.R. ........................ 434/71 |

OTHER PUBLICATIONS

Scott, David, "Road Testing Without a Road" Popular Science, Dec. 1985 p. 66.

Primary Examiner—Jessica J. Harrison, Jr.
Attorney, Agent, or Firm—Fields, Lewis, Pittenger & Rost

[57] ABSTRACT

A method of programming a vehicle simulator to provide an operator of the simulator with exertional and vibrational responses substantially the same as the driver of an actual vehicle would experience when driving the vehicle has been provided. The simulator comprises a frame supporting a vehicle seat from which the operator operates a gear shift, an accelerator pedal, brake pedal, clutch pedal and steering wheel. Inflatable pods are provided under each corner of the simulator to simulate road conditions and turning of the vehicle by selectively deflating them. Each of these controls selectively provides one or more signals to a programmed logic controller (PLC) which provides suitable signals to devices for controlling movement of the simulator to closely simulate movement of a vehicle under similar circumstances. The simulator can be used to determine the tolerance level of a person to the exertional and vibrational levels of a simulated vehicle over a given time period. Thus, the ability of the person to perform the tasks required under normal conditions can be evaluated to determine if the person is employable as a driver of the actual vehicle, or has been rehabilitated following injury to the point of returning to their former job as a driver of the actual vehicle.

6 Claims, 14 Drawing Sheets

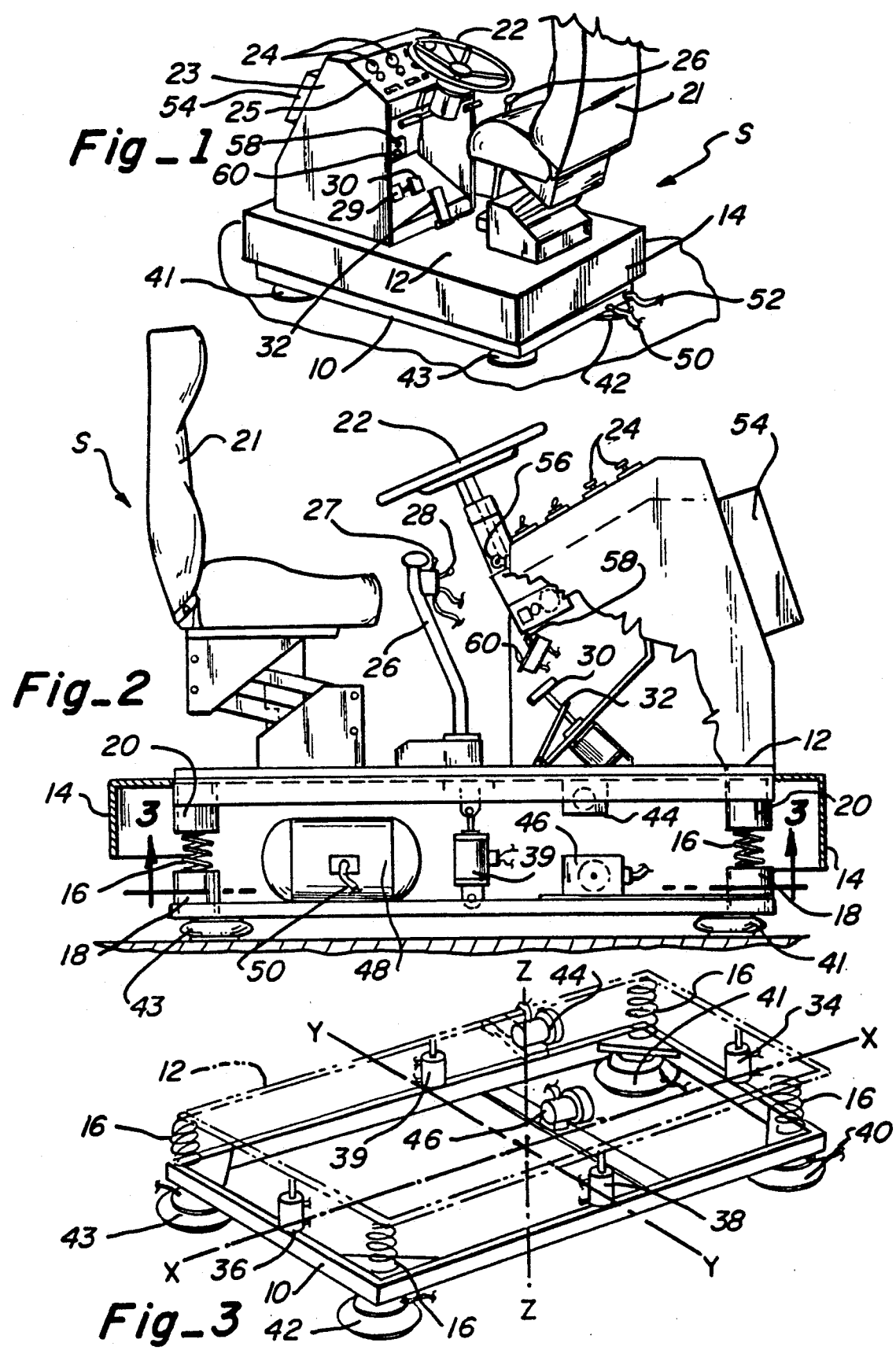

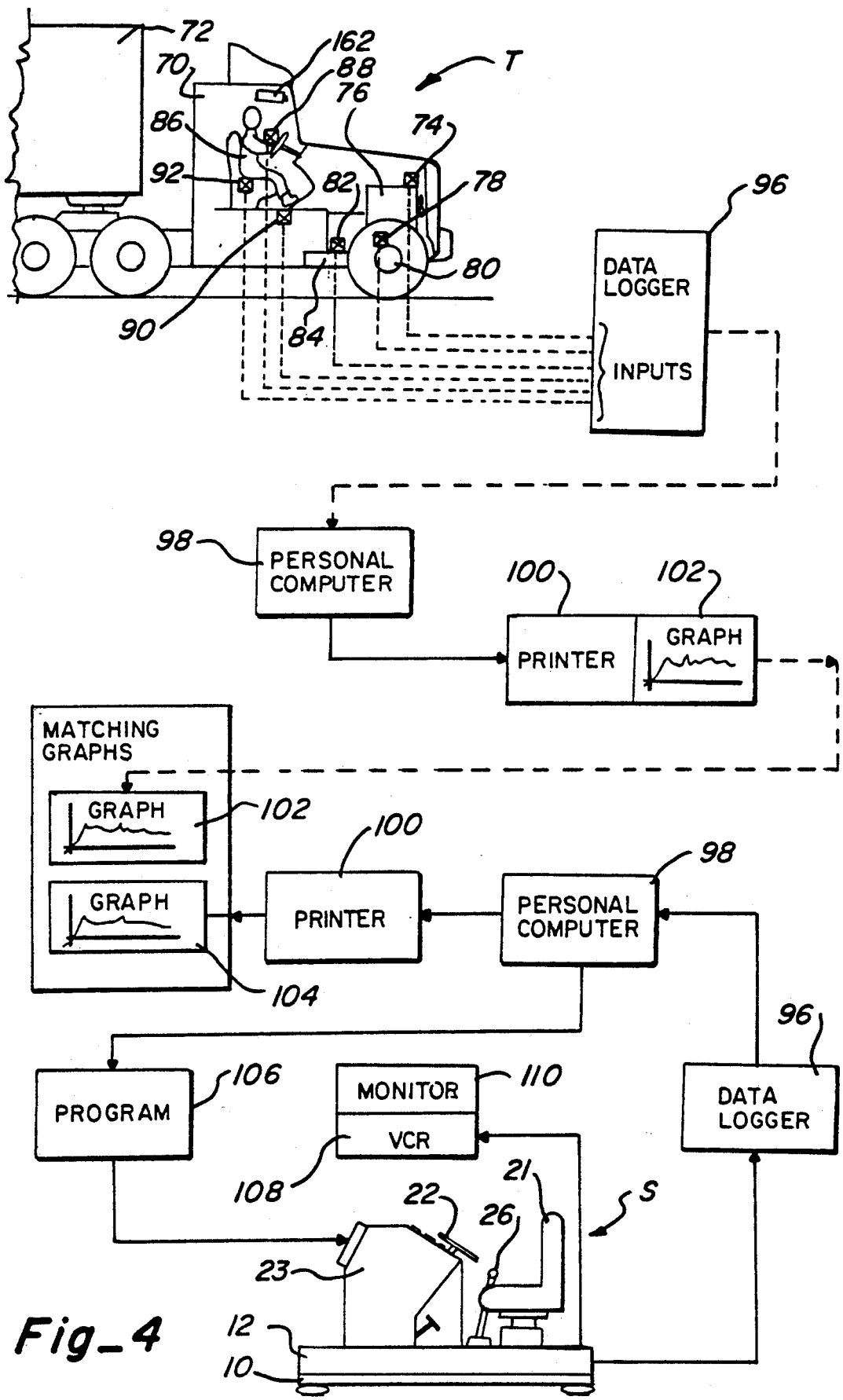
Fig_4

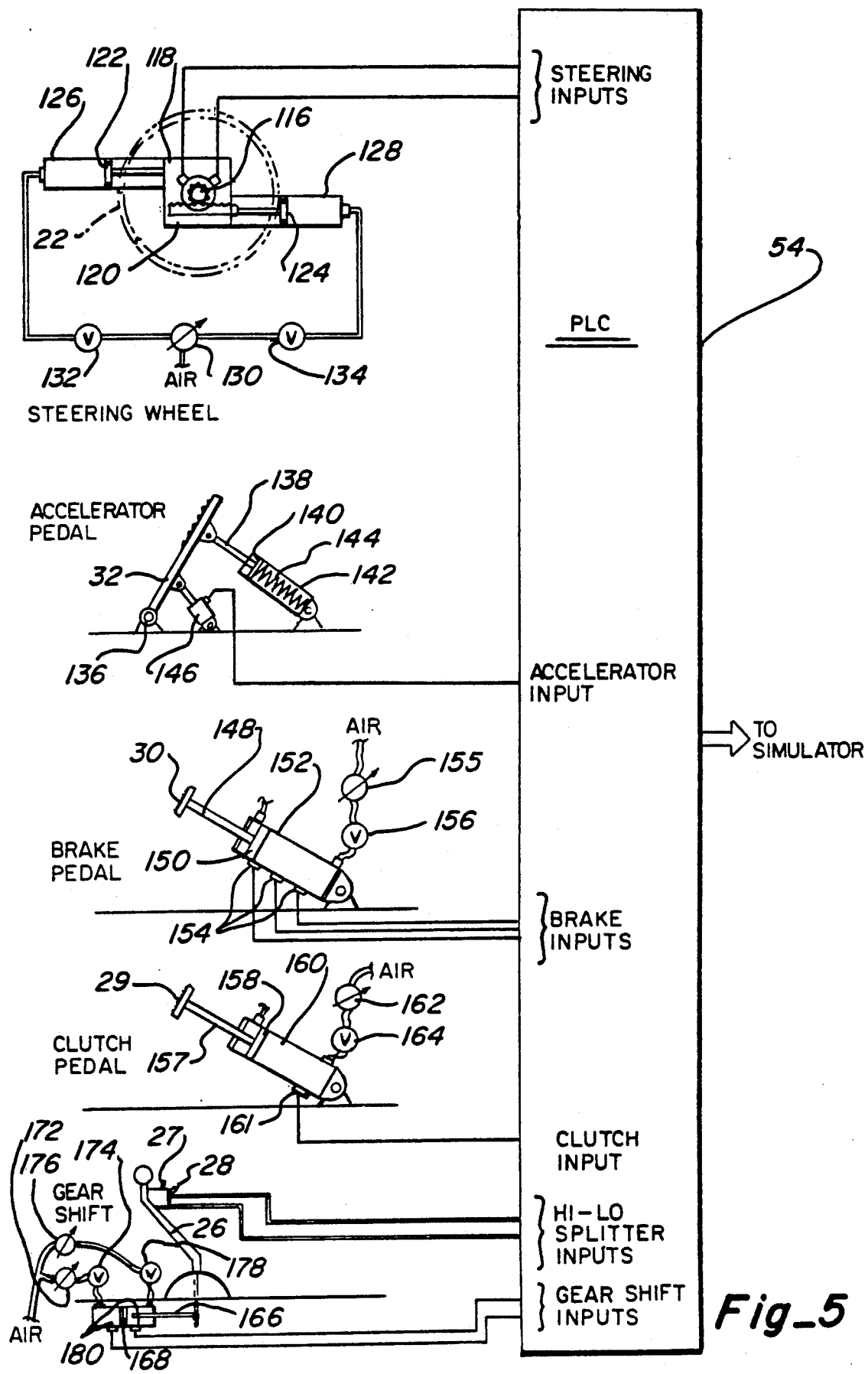
Fig_5

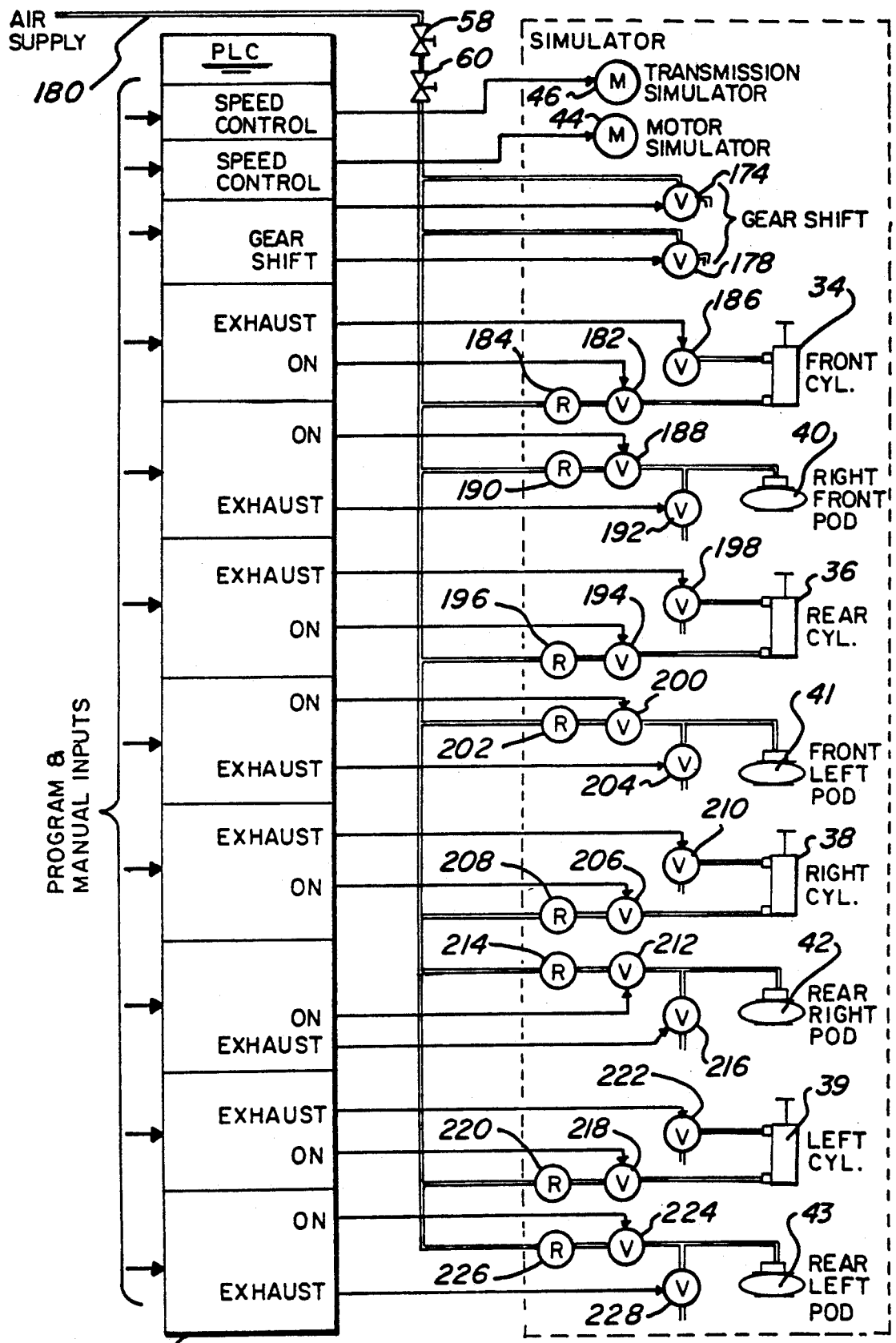
Fig_6

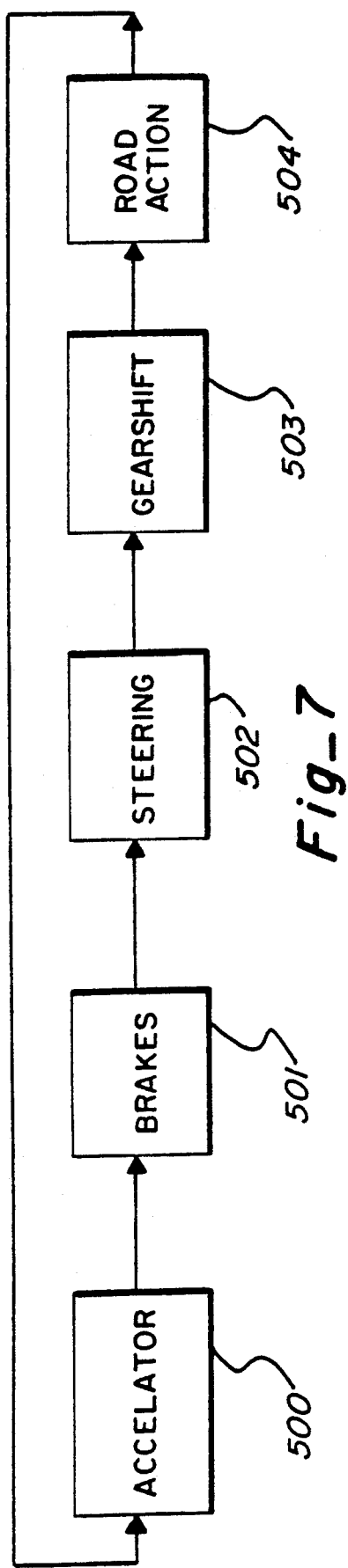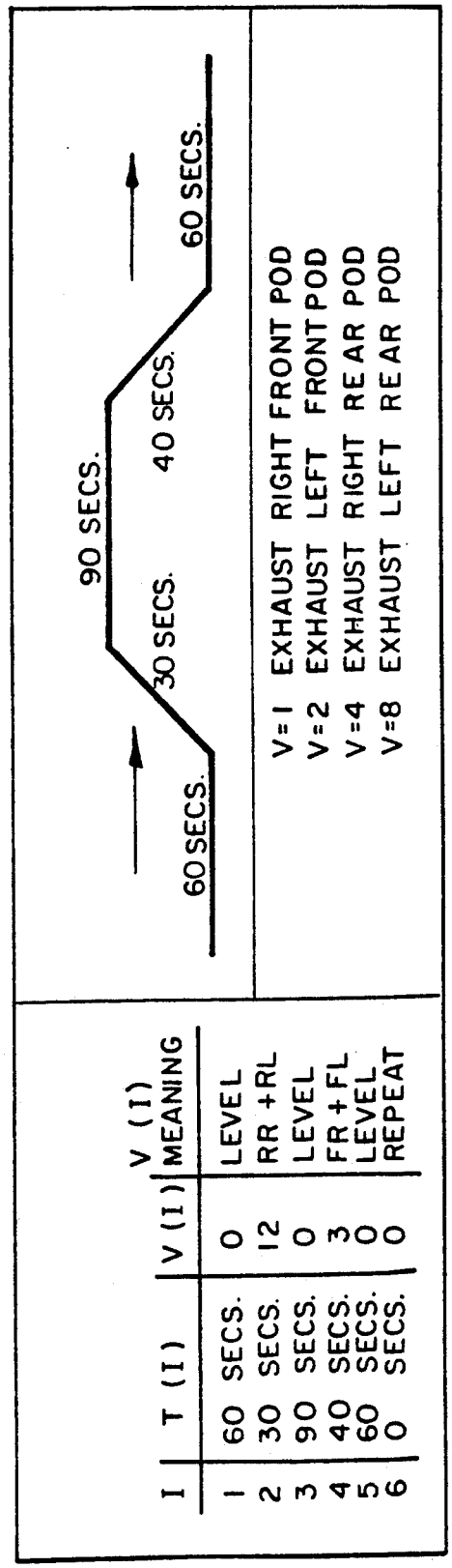

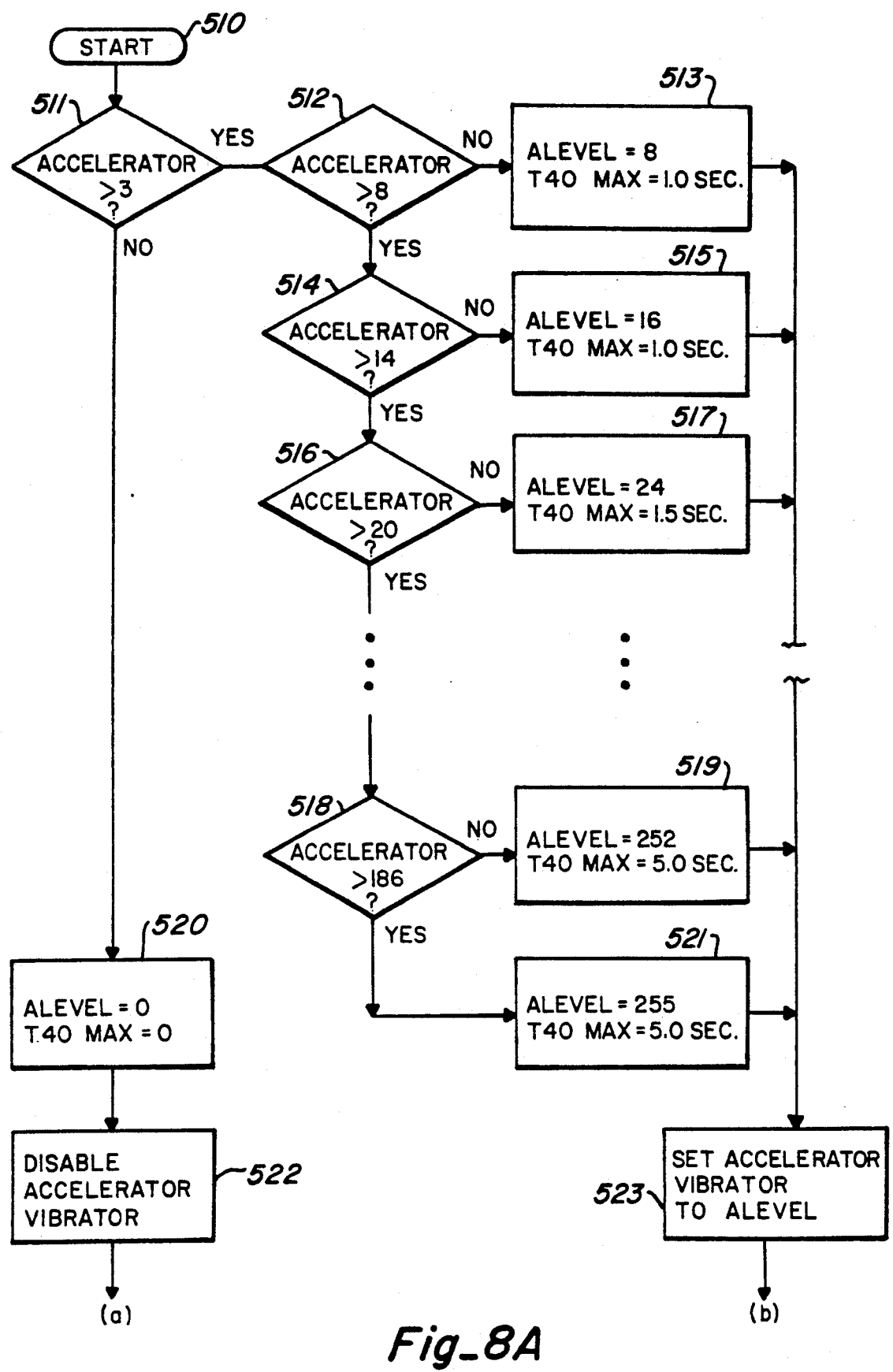
Fig_8A

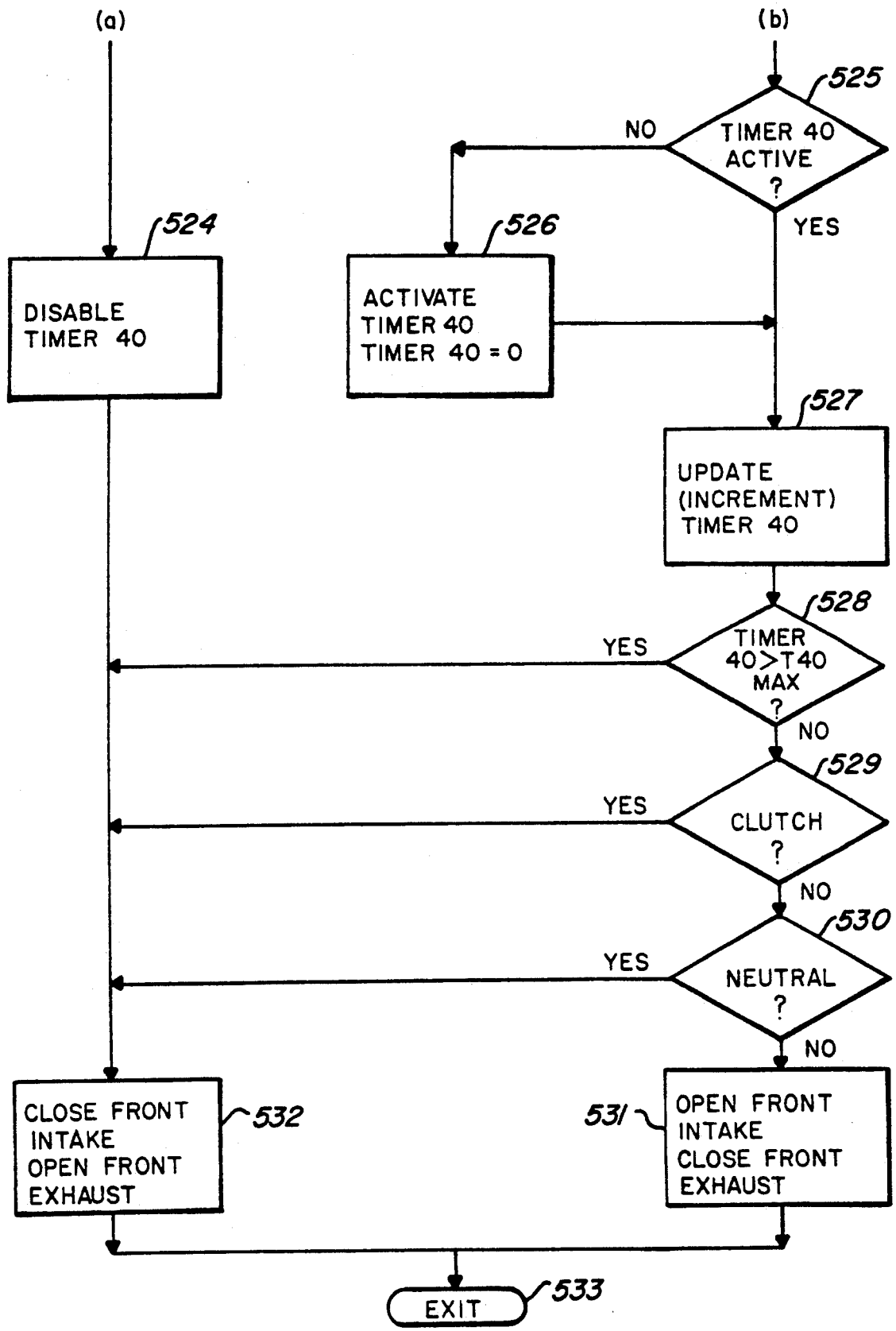
Fig_8B

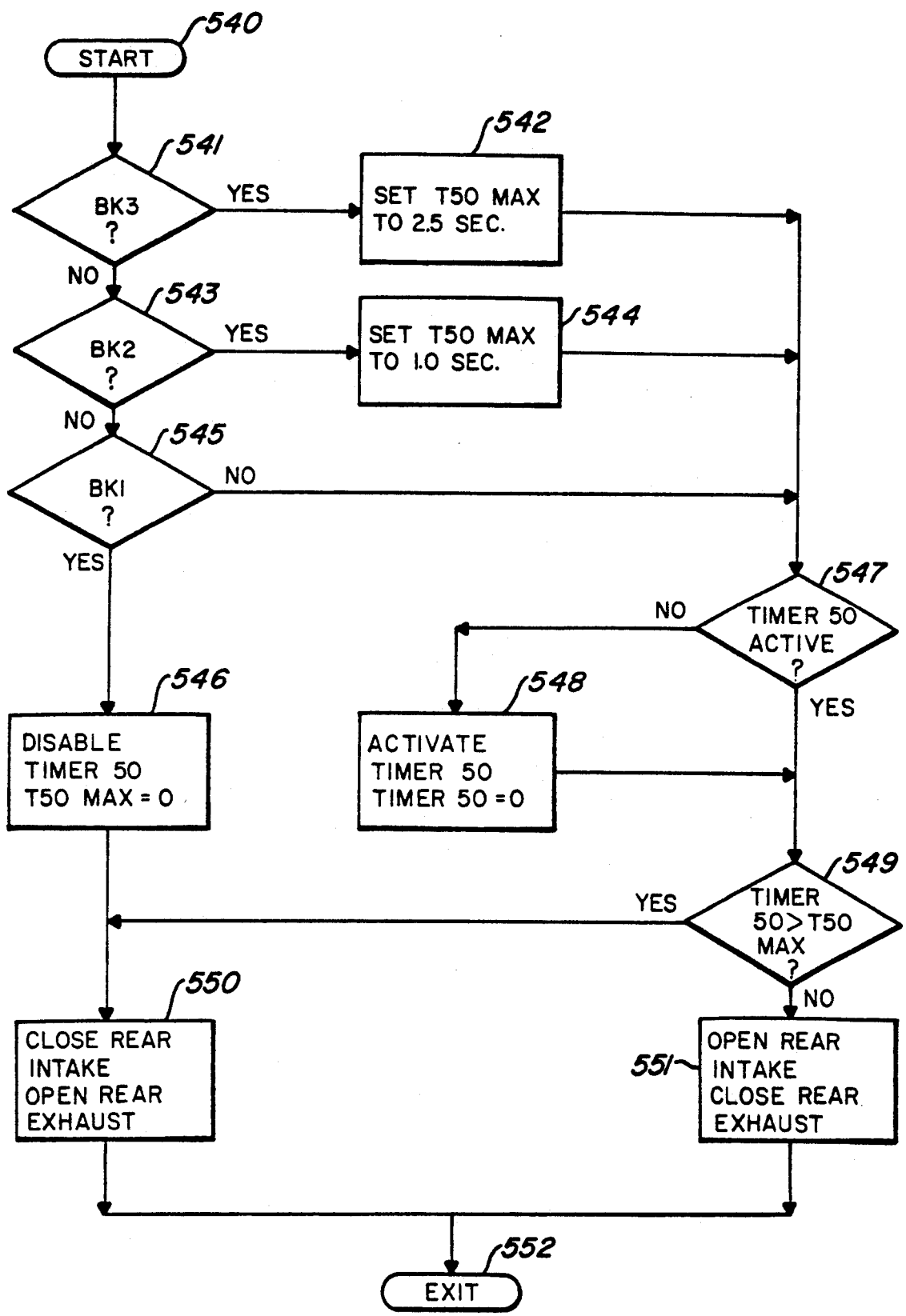
Fig_9

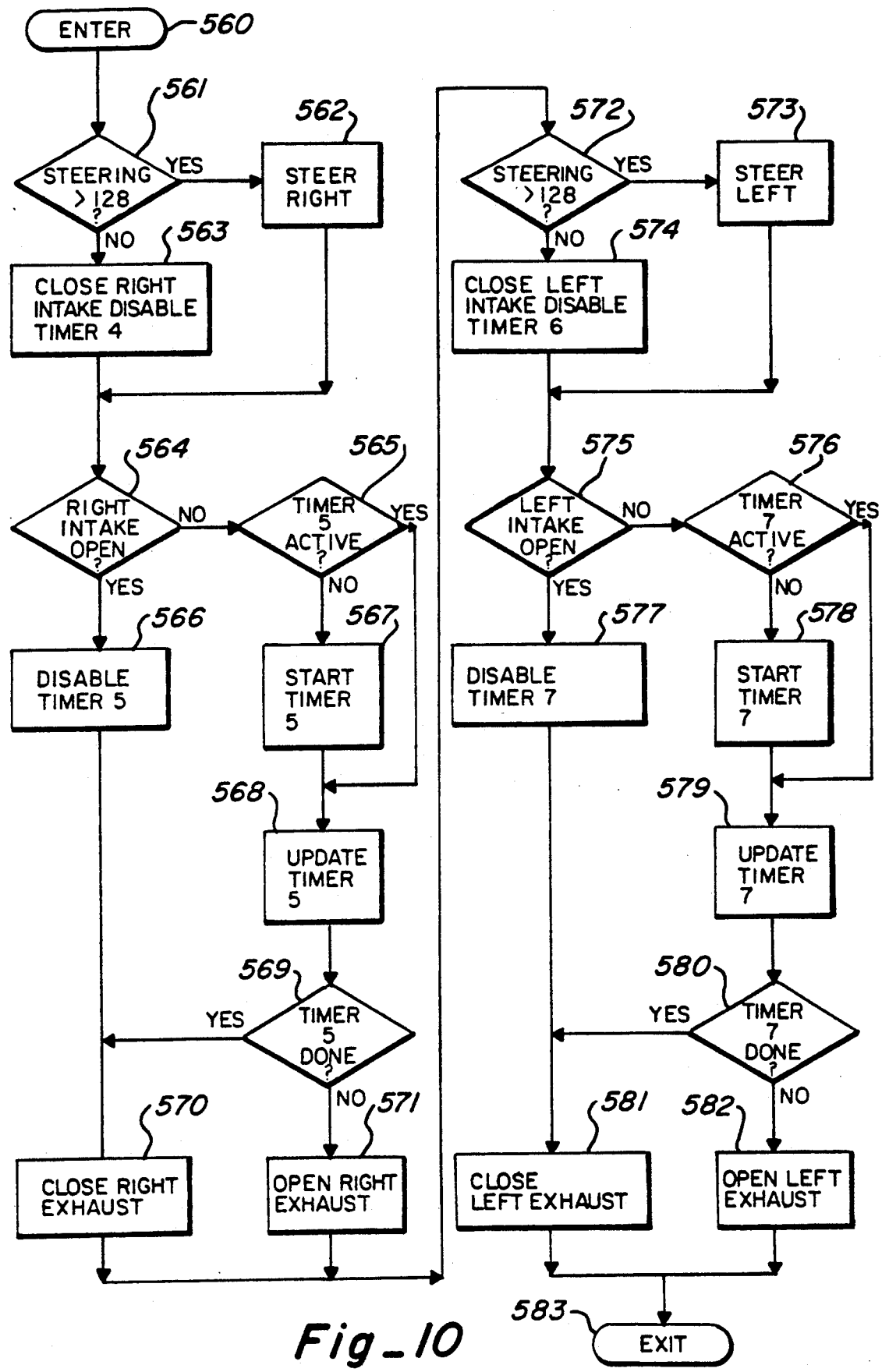
Fig_10

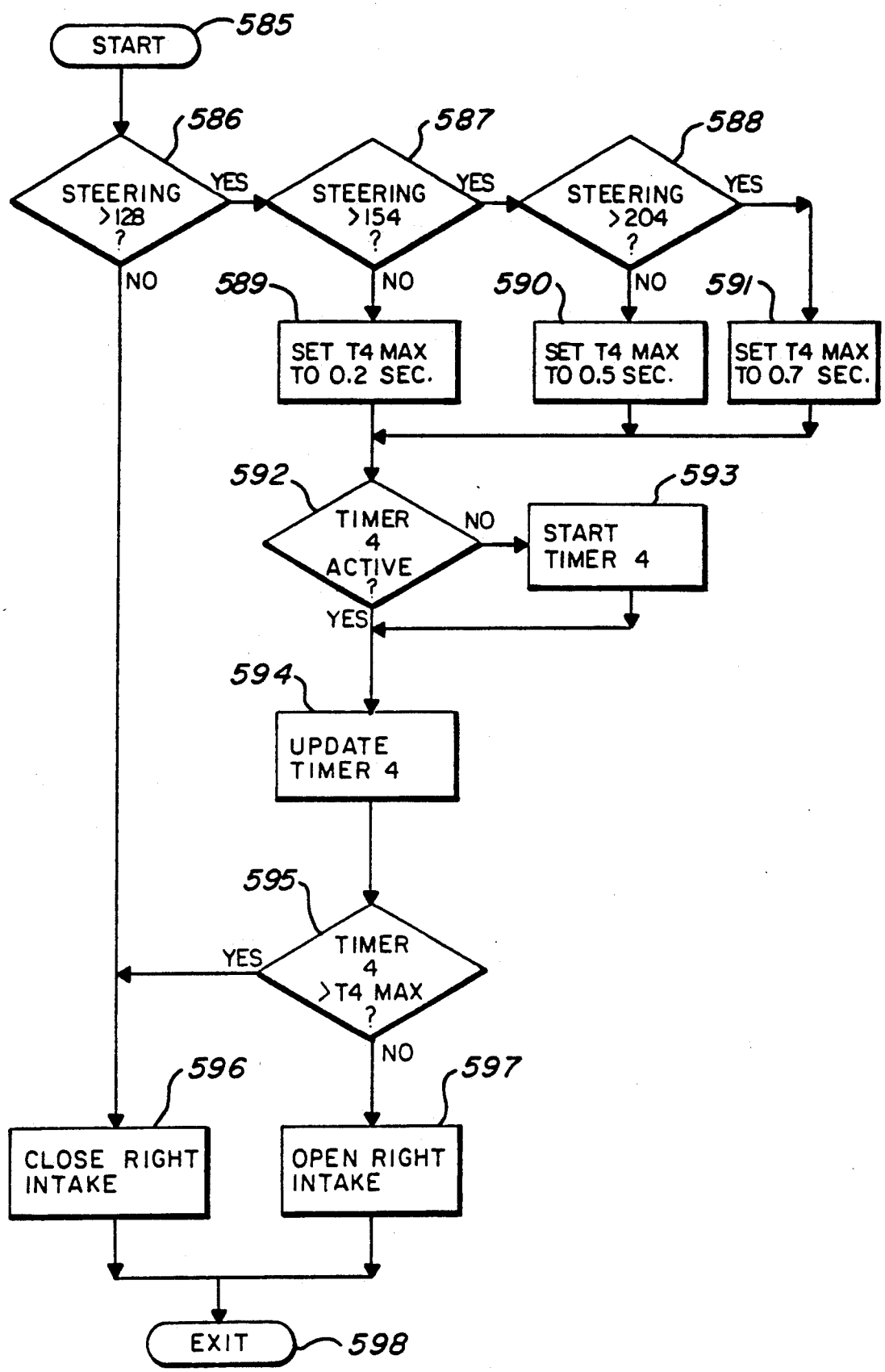
Fig_11

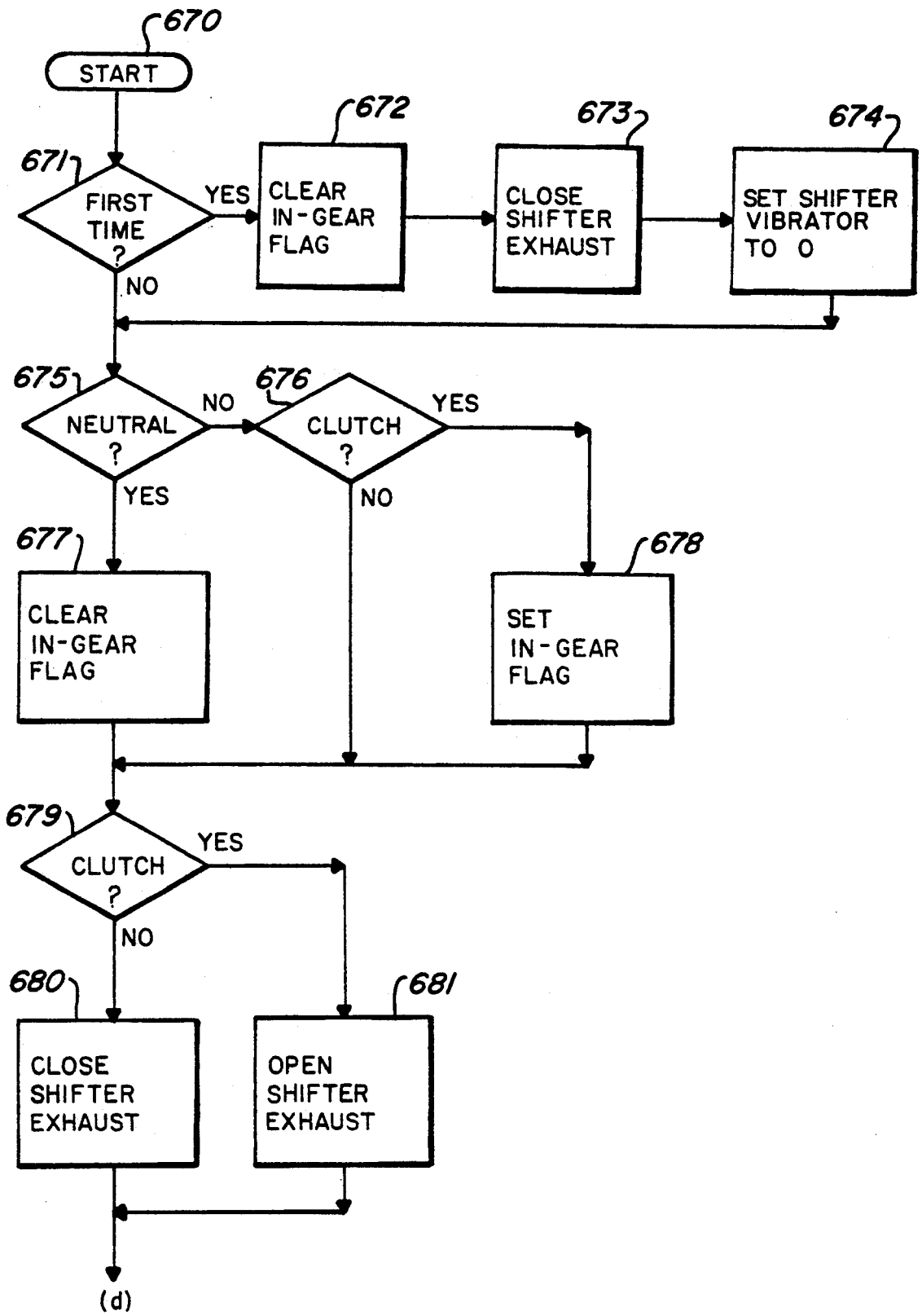
Fig_12A

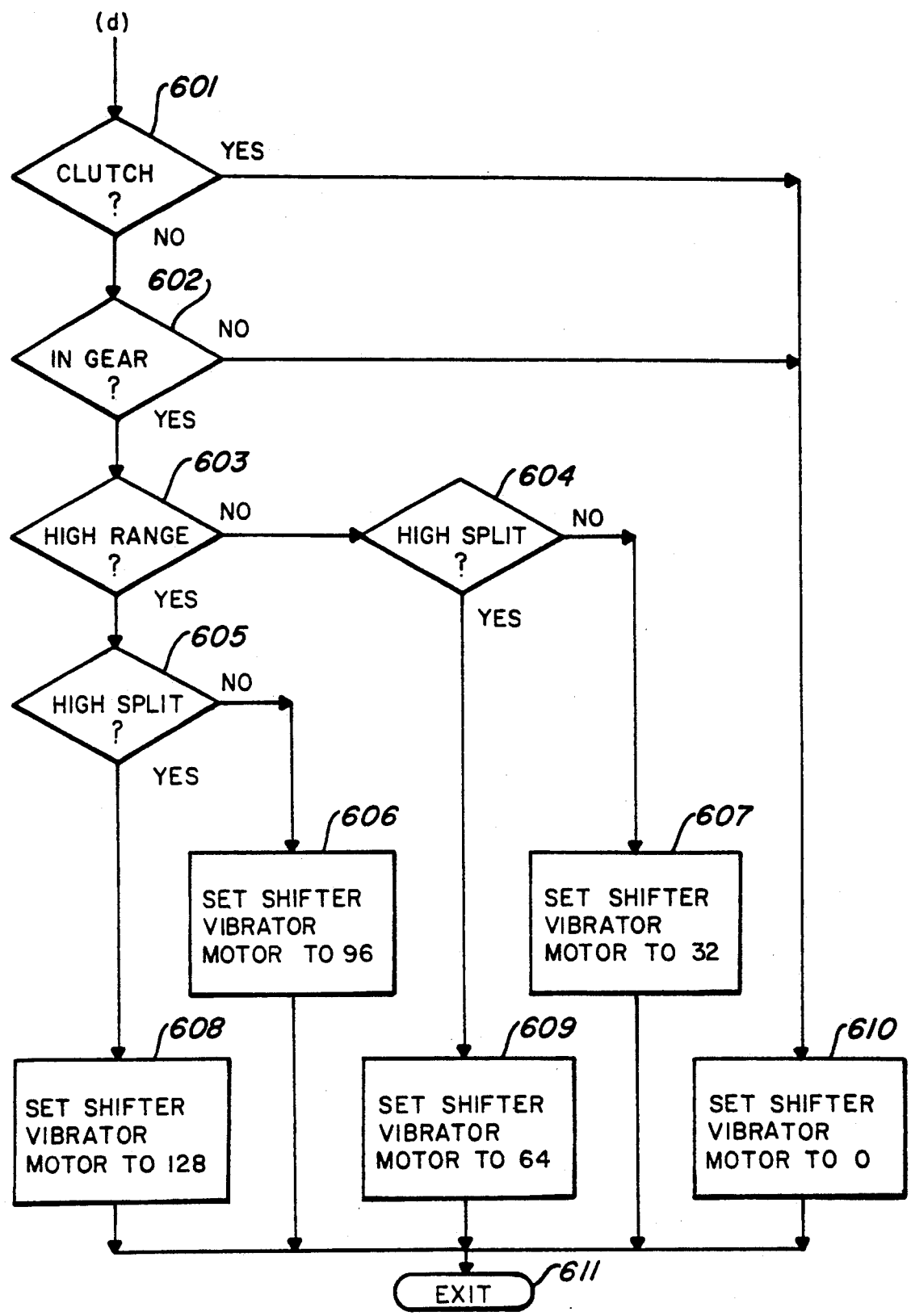
Fig_12B

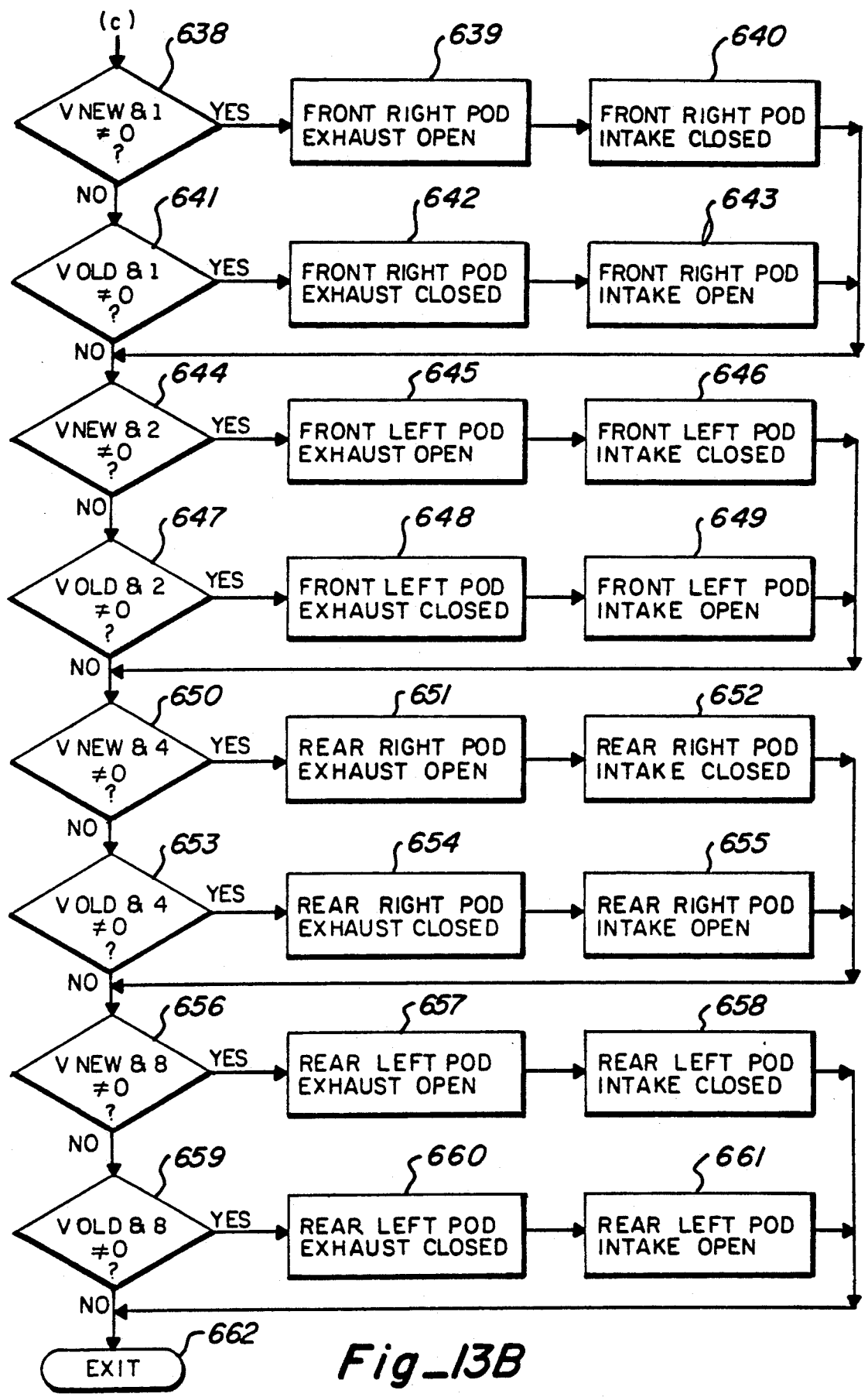
Fig_13B

VEHICLE VIBRATION SIMULATOR AND METHOD FOR PROGRAMMING AND USING SAME

TECHNICAL FIELD

This invention relates to a vehicle vibration simulator, and more particularly to one which can be programmed to closely simulate the responses of a particular vehicle under specific driving conditions to determine a driver's tolerance to vibration and ability to be rehabilitated after injury.

BACKGROUND ART

Every year the number of worker's injured around the world continues to grow. The cost of caring for the aftermath of these injuries is estimated in the hundreds of billions of dollars each year just in the United States. Thus, the need to find solutions both to preventing and treating these injuries in the most efficient and cost effective methods possible is critical. The causes of such increased costs are numerous. Both the costs to the medical providers and the charges they impose on their patients increase because the cost of sophisticated diagnostic and treatment equipment continues to rise. Costs also are increasing, in some cases, because the demand for services is greater than the resources for providing those services. In addition, malpractice claims have proliferated, thereby increasing insurance premiums which are reflected in higher cost to the patient.

Because of the seemingly endless increase in such costs, it becomes more important that employers and potential employers conduct appropriate screening and testing with respect to prospective employees to determine whether they are physically able to handle a given employment task prior to hiring in order to minimize injuries on the job and subsequent rehabilitation and retraining costs. With respect to workers who have been injured, it is important to be able to provide them with rehabilitation training and exercises which will prepare them for reentering the work place and to determine even if they will be able physically to perform the required tasks in the normal work environment.

Such testing, evaluation and training is particularly important with respect to those individuals who will be driving vehicles of all kinds. These vehicles can range from forklift trucks to dump trucks to semi-trailer trucks for travel over extended distances and extended periods of time.

One of the most critical components involving injury is the subjection of the worker to vibration. Vibration has been shown in various research projects to actually contribute to injuries because of the effects it has on the human tissues and structures. Unfortunately, despite the knowledge of this relationship, industry is not able to eliminate it from the work place. Anyone who drives a truck, forklift, heavy equipment, helicopters, etc. are all subjected to varying amounts of vibration. This variation is not only in the amount of time one is subjected to vibration, but also the amplitude and frequency involved when using a specific device or vehicle. Each of these factors must be taken into consideration when attempting to determine if the vehicle operator will be able to return to their job after injury or whether a potential employee has the physical stamina and conditioning to withstand the vibration the job requires.

It has been common place over the past five to ten years for physicians to make the determination on readiness to return to work based primarily on the person's ability to lift the amount of weight which is required by their job. However, with the mounting research regarding the effects of vibration, along with the often unsuccessful return of workers to jobs which have vibration as a component of the work, it is becoming evident that medical practitioners must begin to evaluate the individual's ability to tolerate vibration prior to "giving their OK" that the person will be able to safely perform their job when sending them back to the work place.

In order to do this, one must first be able to go to the vehicle or device at the work site and accurately measure the vibration to which the person is subjected. Then one must be able to come back to the clinic and accurately match the forces and vibration with a testing device which can be used by the person to simulate their actual work environment.

As previously mentioned, the simulator can be used to provide similar information in a pre-employment screening process for jobs requiring sustained exposure to the type of vibration which the simulator provides. Many trucking and bus driving firms find themselves unable to weed out potential employees who are not going to be able to tolerate the seated activities in the job when exposed to vibration, etc. Thus, once hired, if the employee develops back, neck, shoulder, knee, etc. pain, the company is then liable for a worker's compensation claim. This process costs many thousands of dollars each year. Part of this is due to the lack of truthfulness on the part of the applicants for jobs who are eager to obtain well paying employment and/or in some sad cases, attempt to find an employer who they can get to pay medical bills for these previously sustained injuries for which they do not have medical coverage.

Many vehicle simulators have been designed. Among these are those disclosed in U.S. Pat. No. 2,177,501 to Smalley; U.S. Pat. No. 2,269,444 to Durham et al.; U.S. Pat. No. 2,273,091 to DeSilva and U.S. Pat. No. 2,979,831 to Bullock. Each discloses vehicle simulators which measure response time to various stimuli such as changing traffic lights, etc., projected on a screen.

U.S. Pat. No. 3,537,191 to Kazuo Aso discloses a plurality of simulators in front of a movie screen and has means to measure simulated speed versus the instructed rate of speed of the user.

U.S. Pat. No. 3,478,442 to Jazbutis et al. discloses a simulator which measures a driver's response and skill in using a steering column mounted shift lever and a floor mounted shift lever. The simulator pivots and responds to movement of the steering wheel in accordance with images projected on a screen.

U.S. Pat. No. 3,936,955 to Gruen et al. discloses a reduced size vehicle simulator which simulates the use of a clutch and steering wheel and also includes a stall sensor and indicator.

U.S. Pat. No. 4,251,931 to McKechnie discloses a terrain vehicle contour measuring and storage system for a vehicle simulating apparatus wherein four probes measure terrain variations as a gantry moves across a surface and electronically feeds this information to a computer to calculate pitch, roll and heave of a carrier.

U.S. Pat. No. 4,464,117 to Foerst discloses a simulator which includes a viewing screen and means to tilt the device about a longitudinal axis to simulate centrifugal force and to tilt the seat fore and aft to simulate acceleration and deceleration. A vibrator is provided which increases frequency in response to depressing the accelerator pedal.

U.S. Pat. No. 4,750,888 to Allard et al. discloses a simulator to measure steering responses in accordance with images projected on a T.V. screen.

While each of these devices is suitable for its intended purpose, none of them are capable of simulating any one of a plurality of specific vehicles and there is no teaching of using such a device for rehabilitation of an injured person or for testing a person to determine their physical ability to operate a particular vehicle under normal vibrational operating parameters.

DISCLOSURE OF THE INVENTION

In accordance With this invention, a method of programming a vehicle simulator to provide an occupant of the simulator with exertional and vibrational responses substantially the same as the operator of an actual vehicle would experience when driving the vehicle has been provided. The method includes the steps of measuring vibration levels of a vehicle under different operating conditions and road conditions; measuring the exertion levels of the vehicle driver under these same operating conditions and road conditions; measuring the response of the vehicle controls under each different operating conditions and road conditions and programming all of the foregoing measurements into the simulator so that the simulator can replicate the vibrational responses of the vehicle under each operational condition and road condition measured. The method can include the further steps of measuring the vehicle driver's response at one or more body locations with respect to each operating condition and road condition measured. The simulator can be programmed to replicate each vehicle operating condition and road condition to induce any desired measured vehicle driver's vibrational response in the simulator operator.

Furthermore, a simulator operator can operate the simulator while it runs through a series of vehicle simulations and the physical tolerance of the operator can be evaluated to determine his tolerance to simulated driving conditions of the simulator to determine if the person can physically operate the vehicle being simulated. Similar programs can be created from other vehicles for use in the same simulator so that the simulator can simulate the operation of any one of a selected number of vehicles. Conveniently, the evaluator can over-ride the program during simulation if the operator is unable to tolerate the vibrations and other responses of the simulator. Through this evaluation, any abnormal fatigue levels of the operator of the simulator can be identified.

The simulator comprises a frame supporting a vehicle seat, and vehicle controls, such as a gear shift, an accelerator pedal, brake pedal, clutch pedal and steering wheel. Operation of each of these controls selectively energizes responsive devices on frame to simulate vehicle motions and vibrations. The frame is supported on a base by springs which permit movement about X, Y and Z axes. Pneumatic cylinders interconnect the base and frame and are energized to cause selected movements about the axes. These cylinders include a front cylinder, a back cylinder, a left cylinder, a right cylinder. Inflatable pods are provided at each corner of the base which raise the base off the floor at the start-up and are selectively deflated to simulate, incline, grade and banking of the road during operation of the simulator. A first electric vibrator motor is connected to the base. The gear shift has a high-low switch and a splitter switch to provide signals responsive to movement of the gear shift lever from a neutral position to energize the first electric vibrator motor to simulate the vibrations associated with shifting a vehicle. A second electric vibrator motor connects to the frame and is responsive to movement of a variable resistor by the accelerator pedal to increase or decrease the rate of vibration of the second vibrator to simulate the vibrations associated with the vehicle engine during acceleration. Clutch pedal proximity switches provide signals for controlling the shift cylinder, as described more fully below. Brake pedal proximity switches provide signals for controlling expansion and contraction of the back cylinder in response to depression and releasing of the brake pedal to simulate pitch associated with braking a vehicle. The steering wheel operates a variable resistor to provide variable signals for controlling expansion and contraction of the left and right cylinders in response to the amount of turning of the steering wheel. A pinon is mounted for rotation with the steering wheel. First and second racks are engageable with and movable by the pinion upon rotation of the steering to create a resistive force through the right and left cylinders, respectively.

A programmed logic controller (PLC) includes computer circuits which provide a programmed response to signals from the proximity switches, variable resistors and the cylinders. A computer program generated from responses of an actual vehicle traversing a road for a given time period is supplied to the PLC for generating the output signals to the pneumatic cylinders and pods on the simulator. Means is also provided for manual inputs from a therapist to the control panel to override the computer program in the form of manual controls on the dashboard of the simulator. Finally, an audio/visual display may be provided to reproduce sounds and images generated when the vehicle traversed the road during generation of the signals from the vehicle which are used to generate the computer program.

Additional advantages of this invention will become apparent from the description which follows, taken in conjunction with the accompanying drawings.

BRIEF DESCRIPTION OF THE DRAWINGS

FIG. 1 is a fragmentary perspective view of a simulator constructed in accordance with this invention;

FIG. 2 is an enlarged side elevation of the simulator of FIG. 1, with parts broken away for clarity of illustration;

FIG. 3 is a perspective view of the frame and base of the simulator showing the relationship of the pneumatic cylinders and pods thereto;

FIG. 4 is a diagrammatical view of a vehicle and vehicle driver having sensors connected to a data logger for recording responses of the vehicle and the use of these recorded signals with a personal computer to create a computer program for use with the simulator;

FIG. 5 is a diagrammatical view showing the relationship between each of the controls and the PLC;

FIG. 6 is a diagrammatical view showing the relationship between the PLC and each of the pneumatic cylinders and pods;

FIG. 7 is a flow chart of the main simulator program which shows the relationship between the various action programs;

FIG. 8A and 8B together are a flow chart for the accelerator program;

FIG. 9 is a flow chart for the braking program;

FIG. 10 is a flow chart for the steering program;

FIG. 11 is a flow chart for the steer right program;

FIGS. 12A and 12B together are a flow chart for the gear shift program;

FIG. 13A and 13B together are a flow chart for a program for interpreting an encoded road action program; and FIG. 14 is the encoding of a simulated road action program which includes a simulated road and the corresponding encoding.

BEST MODE FOR CARRYING OUT THE INVENTION

Figure 13A:
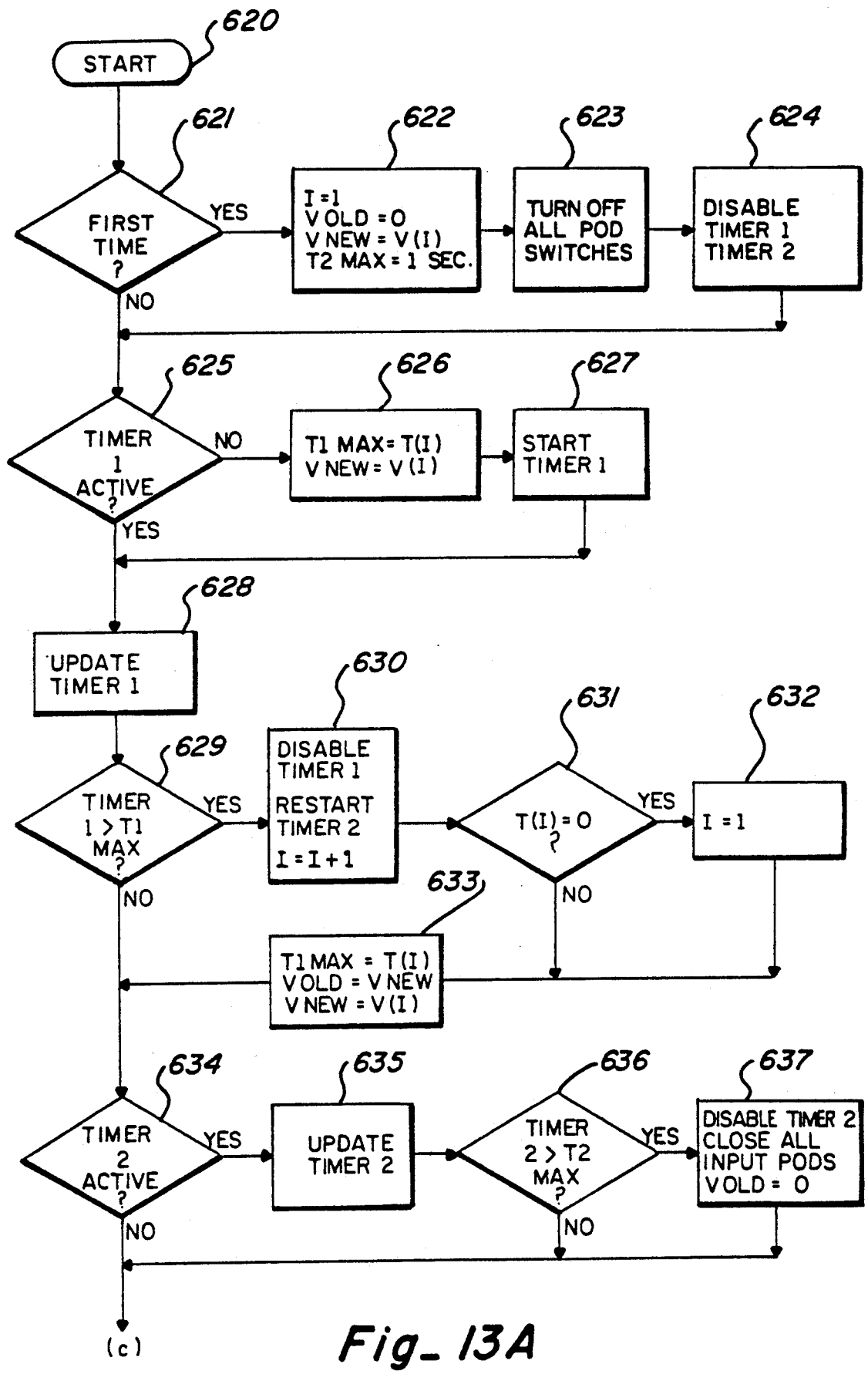

In accordance with this invention, a method and apparatus has been provided which allows for the testing and evaluation of a previously injured worker to determine whether he or she is physically able to return to the job. The method and apparatus of this invention also contemplates a method of screening potential employees to determine whether they are physically able to handle a job before hiring, rather than running the risk and incurring the liabilities associated with injuries occurring on the job or the discovery of latent physical problems after the person is hired.

For example, an evaluation process may be run at a clinic on a client who is recovering from a previous injury. The client is first tested in regard to their tolerance to sitting with no vibration. This can be established in either a standard vehicle seat or by sitting on the simulator seat prior to turning the simulator on. If, over the course of approximately one hour the person does not report any discomfort in their body due to the sitting activity, they are then requested to "ride" on the simulator.

The simulator is set to vibrate at a very low frequency and amplitude and if no discomfort is noted by the client, the parameters are increased in a graded fashion until they match those of the vehicle to be operated by the client. The client is then requested to "ride" the vehicle with these parameters with the addition of pitch, roll, rock, stop, start, bumps, etc. that would be appropriate exposures for the person in their job. When all parameters are matched, the client is requested to "ride" the simulator for the length of time which would be required in their job. If they are able to sustain this activity over the course of a full work shift, they are asked to call the following day to report how they are feeling. If there are no complaints, and if there is no evidence in the past that they have not been able to drive their vehicle for a day or so before symptoms appear, the client is released to return to work. If concern does exist regarding their ability to sustain their performance over time, they will be tested on a repeated basis.

Throughout the testing process the client is monitored by a therapist, both utilizing visual observation of "pain behaviors", posture, etc. and also EMG (electromyogram) to determine unusual muscle activity in response to the stimulus. The client is queried regarding any sensations which he or she may be experiencing throughout the process. If symptoms are noted in the evaluation process are those other then ones like minor fatigue or a need to shift position slightly, the client's evaluation process is terminated.

In the treatment process, a client who has developed symptoms in the evaluation process is started in a "conditioning" program, with parameters set below those which provoked the symptoms. The parameters are increased daily until the client is either tolerating the process to the level which would be required in their job, or it is noted that the client is unable to increase their tolerance level. If they are unable to be "hardened" to the task, the physician is notified of this conclusion and may inform the employer and/or insurance carrier that the client will be unable to return t their previous occupation.

If the client is able to be "hardened", he or she is kept at the process until able to sustain the activity over the course of several days without a change in status and then returned to work. This same sequence can be used to screen new job applicants. Thus, their potential physical fitness for the occupation can be determined before they are hired.

As best seen in FIGS. 1-3 the simulator S of this invention includes a base 10 on which is supported a frame 12 having a skirt 14 around the periphery thereof. The frame 12 is supported on base 10 by means of four springs 16 mounted at each corner. The lower end of each of springs 16 is received in a lower sleeve 18 attached to base 10 and the upper end of each spring is received in sleeve 20 attached to the bottom of frame 12.

On top of frame 12 is an adjustable seat 21 for the operator of the simulator. This seat, which is the same or very similar to that of the actual vehicle being simulated, is mounted behind a steering wheel 22 attached to a console 23 having suitable operator controls 24 mounted on a dashboard 25. A gear shift lever 26 is provided which has range control switches, such as high-low range switch 27 and splitter switch 28. Also provided are a clutch pedal 29, a brake pedal 30 and an accelerator pedal 32. As will be explained more fully below, the steering wheel, gear shift lever and the pedals will be operated by the operator to provide signals to cause the simulator to simulate certain vehicle responses that would normally occur when driving a vehicle.

The frame 12 can be moved relatively to base 10 by means of any one of a plurality of cylinders which extend between base 10 and frame 12. In this regard, a front cylinder 34 is provided along with a rear cylinder 36 which can be alternately expanded and contracted to pivot frame 12 about the Y axis. Similarly, right cylinder 38 and left cylinder 39 can alternately be expanded and contracted to pivot frame 12 about the X axis. The base is supported in all four corners on the floor by inflatable bladders or pods, such as right front pod 40, left front pod 41, right rear pod 42 and left rear pod 43. These pods are initially inflated when the simulator is to be used and can be selectively deflated to simulate grade, incline and banking of a road surface, as more fully explained below. Springs 16 accommodate movement along the Z axis in response to inflation and deflation of the cylinders and pods.

A first vibrator 44 is provided on frame 12 which is associated with acceleration pedal 32 so as to simulate vibration from the engine as the vehicle accelerates. A second vibrator 46 is provided on base 10 to simulate road and transmission vibrations transmitted to the frame 12 through springs 16. The cylinders and pods are connected to a source of air, such as air pressure tank 48. Air is supplied to air tank 48 from a compressor (not shown) through an inlet hose 50. Air is supplied under pressure from tank 48 through a pneumatic system of pressure hoses illustrated in FIG. 6 and described below.

Power to simulator S is supplied through an electrical conduit 52, shown in FIG. 1. Signals from the steering wheel 22, the pedals 29, 30 and 32 and the gear shift 26 are provided to programmable logic controller (PLC) 54, mounted on the front of console 23, from each of these sources. The signals are processed by the PLC which generates output signals for appropriate time periods and of desired intensity to the cylinders and pods. The cylinders and pods then operate for a suitable time duration, in proper sequence to create the desired vehicle response. A suitable programmable logic controller is Model No. FA-2J manufactured by Idec Corporation at 1213 Elko Drive, Sunnyvale, Calif. 94089. Conveniently, an ignition switch 56, shown in FIG. 2, is turned by the operator when he gets into seat 21 to start up the air compressor (not shown) which supplies air to tank 48, and provides power to PLC 54 and the circuits for the controls and other operative devices. Air under pressure from tank 48 immediately pressurizes pods 40, 41, 42 and 43 to raise base 10 off of the ground. After turning on ignition switch 56, the operator opens serially arranged valves 58 and 60, which are located below dashboard 25, to supply air to the inlet valves for each of cylinders 34, 36, 38 and 39, as more fully described below.

One of the distinctive advantages of the present invention is that a computer program can be generated which provides input to the simulator through PLC 54 which either modifies the inputs from the operator or provides additional, supplemental inputs to create different responses in simulator S, particularly those related to a specific vehicle as it is driven under a variety of normal or expected operating conditions. The apparatus for developing such a program is discussed in connection with FIG. 4.

Truck T has a tractor 70 which is illustrated as pulling a trailer 72. Special accelerometers are used to detect movements in one or more directions and are mounted in various locations on the vehicle to be simulated and on the driver. While it is desirable to simulate frequencies between 0 and 60 Hz some of these frequencies can be filtered out to provide those of most interest. Based on scientific studies, a range between 5 and 20 Hz is most critical. A first accelerometer 74 is mounted on motor 76 to provide an output signal corresponding to the vibration of the engine as the truck T is driven over a given course. Similarly, an accelerometer 78 is mounted on axle 80 of the vehicle to provide signals corresponding to the vibration of the axle as it is driven over the course. A third accelerometer 82 is mounted on transmission 84 to provide a signal corresponding to the vibrations of the transmission.

Accelerometers also can be attached to driver 86, such as accelerometer 88 connected to the driver's wrist and accelerometer 90 attached to a leg or ankle. Obviously, the accelerometers connected to the operator could be connected to other portions of the body or in addition accelerometers might be provided. For example, it might be desirable to connect the accelerometer to the head or neck of the operator as well as to other possible locations on the body.

Finally, an accelerometer 92 is provided in the seat 94 of the vehicle on which driver 86 sits. This accelerometer measures movement of the driver along the X axis (side to side), along the Y axis (forward and backward rocking motion) and along the Z axis (vertical or bouncing motion). All three of these combined but independent measurements are filtered through a band width filter selected to a frequency which scientific study has shown to affect the human body.

Also, the foot-pounds of resistance offered by the clutch pedal, brake pedal, accelerator petal, steering wheel and gear shift can be measured. The operation of the vehicle can be repeated with operators having different sized body frames and weight to obtain response data which can be used to evaluate the stress level of clients within the normal stress levels of vehicle operators of similar size and weight.

The data from each of the previously described accelerometers is stored in a portable data logger 96 at a set rate of frequency and amplitude to record the vibrations on the vehicle and the operator as it traverses a given course. A suitable data logger is the "Ranger II" manufactured by West Instrument, a Mark IV Industry Company at 2101 Oxford Road, Des Plaines, Fla. 60019. Subsequently, the stored data in the portable data logger 96 can be transferred to the hard file disc of a personal computer 98. A computer software program, such as the Pronto-Rustrak Application Program, is then used by the operator of personal computer 98 to superimpose this data through a printer 100 onto a pre-scaled X-Y plotted graph 102. The signals taken from the data logger are promptly cataloged in order to properly recreate the same signals in the simulator S at a future time. At the same time the data logger 96 is recording the inputs from the various accelerometers, a video camera 104 is recording on video tape the scene viewed by the driver 86 as he or she drives over a predetermined course. This tape can be recorded in timed sequence with the inputs to data logger 96. The video camera is mounted on the cab of truck 70 to view and record the same road scene and sounds as the driver experiences as he drives over the course.

In order to recreate the responses recorded by data logger 96 from truck 130 into simulator S, data logger 96 is connected between simulator S and personal computer 98 as shown in the lower portion of FIG. 4.

The graph 102 printed out and compared with a second graph 104 which is created from outputs from simulator S generated by sensors mounted in the simulator in the same location and relationship to those of truck T. The output from simulator S to data logger 96 is downloaded into personal computer 98 and through printer 100 is printed out as graph 104. Through the comparison of graphs 102 and 104, the operator of the computer creates a program 106 which can be inputed into PLC 54 to recreate the ride on simulator S that was undertaken in truck T. It will be understood that each accelerometer on truck T will generate a different graph which must be recreated for inputing to program 106 so that all responses recorded on data logger 96 will be substantially duplicated in simulator S when the program is run. Conveniently, in generating the program, an individual of similar weight to driver 86 will ride in simulator S so that the output signals therefrom to data logger 96 through the graph comparisons can be duplicated as nearly as possible. At the same time the ride is being simulated, the video tape can be played on VCR 108 and displayed through monitor 110 so that the operator of simulator S will experience a ride on the simulator which approximates that of the original driver 86 of truck T. Manual inputs and overrides to PLC 60 can be provided by the evaluator or therapist through controls 24 on dashboard 25 to override the commands from the program package 106. This is useful when the therapist is attempting to determine the client's tolerance level or to harden the client to increased stress limits.

Now turning to FIGS. 5 and 6, the inputs to and outputs from PLC 60 will be discussed, respectively. Steering wheel 22 is provided with a pinion 116 which rotates with the steering wheel to move racks 118 and 120 and associated pistons 122 and 124, respectively, within cylinders 126 and 128, respectively. Thus, when steering wheel 22 is turned counter clockwise, piston 122 will move to the left within cylinder 126 and piston 124 will move to the right within cylinder 128. Similarly, upon turning steering wheel 22 in a clockwise direction, piston 122 will move to the right and piston 124 will move to the left. The cylinders are respectively connected to a source of air, such as air tank 48 shown in FIG. 2. This air is supplied through a regulator 130 and valves 132 and 134, respectively. Thus, resistance is provided against turning the steering wheel, similar to that encountered in turning the steering wheel on a conventional vehicle. By adjusting the valves, the resistance can be increased or decreased, as desired, to match the resistance of the vehicle being simulated.

Conveniently, a variable resistor, such as rheostate 135, provides a variable output signal to PLC 54 indicative of the amount of rotation of steering wheel 22 in both the clockwise and counter clockwise directions. The PLC 54 processes these signals through a suitable computer therein which generate output signals to cause the appropriate movement of frame 12, as will be more fully described below with respect to FIG. 10.

The accelerator pedal 32 is mounted for rotation about a pivot point 136. A rod 138 is pivoted adjacent the upper end of the accelerator pedal and has a circular plate 140 which is movable within cylinder 142 against the force of spring 144 therein. A variable resister or rheostat 146 is connected to accelerator pedal 32 by rod 148 which changes the resistance to provide a variable output signal to the controller in response to the amount of depression of the accelerator pedal to provide a signal to the controller which is used to activate the vibrator motor 44, of FIG. 2, to simulate motor vibration. The more pedal 32 is depressed the more vibrator motor 44 will vibrate to simulate vibrations of an accelerating engine.

Brake pedal 30 is connected to a piston rod 148 which operates a piston 150 within cylinder 152 to sequentially close proximity switches 154 depending on the amount the brake pedal is depressed. In response to the depression of brake pedal 30, PLC 54 will provide a signal to front cylinder 34 causing it to inflate. Air is supplied under pressure from a suitable source, such as air tank 48, through a regulator 155 to a valve 156 for providing resistance to the depression of the brake pedal by the operator. This resistance can be varied to simulate any specific vehicle. The distance brake pedal 30 is depressed will determine how many proximity switches 154 are closed.

Clutch pedal 29 is connected to a piston rod 157 which operates a piston 158 within cylinder 160 to activate proximity switch 161 when the clutch pedal is depressed to provide a signal to PLC 60 identifying the position of clutch pedal 29. Air under pressure is provided from a suitable source, such as tank 48 of FIG. 2, through regulator 162 and valve 164 to cylinder 160 to provide back pressure to the clutch pedal. This pressure can be adjusted, as desired, to simulate different vehicles.

Gear shift lever 26 is provided with a high-low switch 27 and splitter switch 28 to provide output signals to PLC 54 which will vary the vibrations produced by vibrator motor 46 in accordance with the gear the gear shift is in. Resistance to movement of the gear shift lever can be varied through piston rod 166 pivotally attached to the lower end of gear shift lever 26 and having the other end connected to a piston 168 in a cylinder 170. Air is supplied to cylinder 170 by a regulator 172 and a valve 174 at one end and regulator 176 and valve 178 at the other end to provide resistance to movement of the gear shift. However, the piston 168 is magnetic and when it is in a central neutral position, a signal from magnetic sensors 180 will provide a signal to PLC 54 to open valves 174 and 178 so the gear shift can be moved freely when the clutch is depressed, as illustrated in FIG. 12A.

The number of sequentially arranged proximity switches shown for each function is for purposes of illustration only. A greater or lesser number can be used depending upon the amount of sophistication desired in the simulator.

Now turning to FIG. 6, air supply line 180 is shown which provides air under pressure from pressure tank 48 of FIG. 2 through air valves 58 and 60 to the respective valves and regulators. In this regard, the PLC 54 provides a signal to valve 182 which allows air to pass through regulator 184 to front cylinder 34. An exhaust valve 186 also receives an input signal from PLC 54 which controls the exhausting of air from this cylinder in accordance with the computer program, described below. Similarly, a signal from the PLC to valve 188 controls the flow of air through regulator 190 to right front pod 40. An exhaust valve 192 is controlled by the PLC. In the same manner, a valve 194 is controlled by PLC 54 to allow air under pressure to be supplied through regulator 196 to rear cylinder 36. An exhaust valve 198 is controlled from the PLC. Inlet 200 for pod 41 is controlled through PLC 54 and allows air to flow through regulator 202 to the pod. Exhausting of air from pod 41 is controlled by valve 204 through PLC 54. Air to right cylinder 38 is provided by valve 206 through PLC 54 allowing air to flow through regulator 208 to the cylinder. Exhaust air is exhausted through valve 210 which is also controlled by the PLC. In the same manner, air to right rear pod 42 is supplied through valve 212 which is controlled by the PLC and through regulator 214. Exhaust air is controlled by valve 216 connected to PLC 54. Left cylinder 39 is supplied air by valve 218, controlled by the PLC, and through regulator 220. The exhaust air passes through valve 222 also controlled by the PLC. Finally, the left rear pod 43 is supplied air through valve 224, controlled by the PLC, and regulator 226. The exhaust air passes through valve 228 also controlled by the PLC.

It will be apparent to one skilled in the art that PLC 54 will be required to identify which signals take precedence over others when signals from multiple circuits within it are being supplied to the various cylinders, as shown. Generally, the signals generated by the program will have the highest priority. The next priority will be those created by the operator of simulator S and the least highest priority will be those created by the therapist through controls 24 on dashboard 25. Either the operator or the therapist can shut down the simulator entirely by turning off ignition switch 56, sometimes referred to as a "kill switch", should the operator become exceedingly stressed requiring a termination of the simulated activity.

The programming in the invention is done with PLC 54. The PLC allows both digital and analog inputs and outputs. The digital inputs to 54 PLC are boolean sensors. They respond either true(1) or false(0). The digital outputs from the PLC usually open (1) or close (0) a pneumatic valve. There are two analog inputs to the PLC. Both are translated into eight bit digital values with ranges from 0 to 255. Likewise, there are two analog outputs from the PLC, the source of each an eight bit digital value.

The PLC is programmed in what is called "Ladder Logic". This allows certain inputs to drive specific outputs as shown in FIG. 7, the simulator has five main "Ladder" programs, one for the Accelerator 500, the Brakes 501, Steering 502, the Gear Shift 503 and for simulating Road Action 504. To the observer, it appears that all five programs operate simultaneously. In actuality, they are executed sequentially, then the sequence is repeated. The appearance of simultaneity is a result of the PLC's ability to execute each sequence of the five "Ladder" programs in a small fraction of a second.

The Accelerator program 500 of FIG. 7, as illustrated in FIGS. 8A and 8B, attempts to do two things. First, the accelerator vibrator motor 44 is set to some specific speed based on the extent that the accelerator pedal 32 is depressed. This simulates the vibrations of a truck's engine 76. Secondly, when accelerator pedal 32 is first depressed, the simulator S will rock back, simulating acceleration. This is done by opening the front cylinder intake valve 182 and closing the corresponding front cylinder exhaust valve 186. This causes the front of simulator S to rise up. The "rocking back" does not occur if either the clutch pedal 29 is depressed or the gear shift 26 is in neutral.

The Accelerator Program 500 first checks the analog value corresponding to the amount of depression of the accelerator pedal. This analog value is mapped onto an eight bit digital value, with a range of 0 to 255. A value of zero (0) indicates that the accelerator pedal 32 is not being depressed.

If the accelerator value is not greater than 3 511, the ALEVEL is set to 0, T40Max is set to 0 520, the accelerator vibrator motor 44 is turned off 522, Timer#40 is disabled 524, the front cylinder intake valve 182 is closed, the front cylinder exhaust valve 186 is opened 532, and the program exits 533.

Otherwise if the accelerator value is greater than 3 511, ALEVEL and T40Max values are determined based on the accelerator value. For example, if the accelerator value is not greater than 8 512, ALEVEL is set to 8 and T40Max is set to 1 second 513. Otherwise, if the accelerator value is not greater than 14 514, ALEVEL is set to 16 and T40Max is set to 1 second 515. Equivalent tests are made throughout the range of possible values for the accelerator pedal 32. Finally, if the accelerator value is grater than 186 518, ALEVEL is set to 255 and T40Max is set to 5 seconds 521.

Once the ALEVEL and T40Max values have been set, the accelerator vibrator motor 44 is set to ALEVEL 523. Timer#40 is checked. If not active 525, the timer is activated and set to zero 526. Timer#40 is then updated to correspond to the current time 527. If either the Timer#40 value is greater than T40Max 528, the clutch pedal 29 is depressed 529 or simulator S is in neutral 530, the front cylinder intake valve 182 is closed and the front cylinder exhaust valve 186 is opened 532. Otherwise, the front cylinder intake valve 182 is opened and the front cylinder exhaust valve 186 is closed 531. In either case, the program then exits 533.

The purpose of the Brake Program 501 of FIG. 7, illustrated in FIG. 9, is the opposite of the Accelerator Program 500. The simulator "rocks forward" for a specified period of time when the brake pedal 30 is depressed, simulating deceleration. The amount of time that the simulator is "rocking forward" is based on how hard brake pedal 30 is depressed. The "rocking forward" is done by opening the rear cylinder intake valve 194 and closing the rear cylinder exhaust valve 198. When the deceleration time expires, the "rocking forward" is terminated by closing the rear cylinder intake valve 194 and opening the rear cylinder exhaust valve 198.

After entering the Brake Program which begins at 540, a check is made for BK3 541. This corresponds to the brake pedal position all the way to the floor. If BK3 is set 541, T50Max is set to 2.5 seconds 542. Otherwise, a check is made for BK2 543. This corresponds to the brake pedal 30 being depressed at least half way to the floor. If BK2 is set 543, T50Max is set to 1 second. Finally, BK1 is checked 545. This corresponds to the brake pedal 30 not being depressed. If BK1 is not set 545, or if BK2 543 or BK3 541 is set, Timer#50 is checked 547. If Timer#50 is not active 547, it is activated, and set to zero 548. A check is then made of Timer#50 549. If it is less than T50Max 549, the rear cylinder intake valve 194 is opened and the rear cylinder exhaust valve 198 is closed 551. Otherwise, if either BK1 is set 545 or Timer#50 has expired 549, the rear cylinder intake valve 194 is closed and the rear cylinder exhaust valve 198 is opened 550. In all cases, the program then exits 552.

The purpose of the Steering Program 502 of FIG. 7, as illustrated in FIG. 10, is to simulate the centrifugal "G" forces placed on a driver when a truck goes around a corner. The simulator does this by sensing when the steering wheel 22 is turned either right or left. Then, either the right cylinder 38 or the left cylinder 39 is activated for a specified period of time, depending on the amount the steering wheel is turned.

The Steering program begins 560 by checking the steering analog input 561. This analog input ranges from 0 to 255. The center is at a value of 128, with right turns indicated by values greater than 128, and left turns with values less than 128. If the steering analog input value is greater than 128 561, the Steer Right program is entered 562. This program determines how long to open the right cylinder intake valve 206. Otherwise, if the steering analog input value is less than or equal to 128 561, the right intake cylinder 206 valve is closed and the Timer#4 is disabled 563.

In either case, the right cylinder intake 206 valve is checked. If the valve is open 564, Timer#5 is disabled 566, and the right cylinder exhaust valve 210 is closed 570. Otherwise, Timer#5 is checked as to whether it is active 565. If not active, Timer#5 is started 567. In either case, Timer#5 is now active. The timer is now updated 568. It is then checked to determine whether it is done 569. If Timer#5 is done 569, the right cylinder exhaust valve 210 is closed. Otherwise, when the timer is not done, the right cylinder exhaust valve 210 is opened 571.

In any case, regardless of whether the right cylinder exhaust valve 210 is opened 571 or closed 570, the steering program now checks for steering left. This is done by checking the steering analog input for a value less than 128 572. If a steering value less than 128 is found, the Steer Left program is invoked 573. Otherwise, the left cylinder intake valve 218 is closed and Timer#6 is disabled 574. As can be seen from the Figures, the logic for a left turn is identical to that of a right turn, with the exception that left cylinder intake valve 218 and exhaust valves 222, respectively, are opened and closed instead of their right cylinder counterparts, and Timers 6 and 7 replace Timers 4 and 5. At the end of the left turn logic, the Steering Program exits 583.

The Steer Right program entered at 562, as illustrated in FIG. 11, is invoked from the Steering Program 502 when the steering analog input has a value greater than 128 561. The program enters 585 and immediately checks the steering analog input 586. If the value of the analog input is less than or equal to 128, the cylinder right intake valve 200 is closed 596, and the program exits 598.

Otherwise, the analog steering input is checked for a value greater than 154 587. If the analog steering input value is less than or equal to 154, T4MAX is set to 0.2 seconds 589. Otherwise, if the analog input is greater than 154 587 but less than 204 588, T4MAX is set to 0.5 seconds. Finally, if the analog steering input is greater than 204 588, T4MAX is set to 0.7 seconds.

In all cases where the analog steering input has a value greater than 128 586, a check is made whether or not Timer#5 is active 592 If the timer is not active, it is started 593. Timer#4 is then updated to reflect the passage of time 594. Timer#4 is next checked as to whether it exceeds T4MAX 595. If Timer#4 is not greater than T4MAX, the right cylinder intake valve 206 is opened 597. Otherwise, the right cylinder intake valve 206 is closed 596 In either case, the program then exits 598.

The operation of the Steer Left routine 573 is exactly analogous to that of the Steer Right routine 562 except that the left cylinder intake valve 218 is opened or closed instead of the right cylinder intake valve 200, Timer#6 instead of Timer#4 is used, and T6MAX instead of T4MAX is set and checked. The range checks for the steering analog input can be determined by subtracting the steer right values from 256, and reversing the checks (i.e. changing from greater than tests to less than tests).

The purpose of the Gear Shift Program 503 of FIG. 7, as illustrated in FIGS. 12A and 12B, is to simulate the interaction between the clutch pedal 29, the gear shift 26 and a shifter vibrator motor 46. First, the program releases the resistance on the gear shift 26 whenever the clutch pedal 29 is depressed. Secondly, assuming the simulator S is "In-Gear", the vibration level of the truck T is based on what gear the simulator is in. A second vibrator motor 46 is used. The level of vibration is set based on what range the gear shift is in. The gear shift lever 26 has two switches on it. One switch 27 is for high and low range. The second switch 28 is a splitter. The four possible combinations of range and splitter give a rough approximation of the actual gear in which a corresponding truck would be. This in turn gives a rough approximation of the speed of the truck. The vibrator motor 46 is disengaged whenever either the clutch pedal 29 is depressed or the simulator is not "In-Gear".

In the Gear shift Program 503, a check is first made whether this is the first time the program has been entered 671. If this is the first time, initialization is performed. This consists of clearing the In-Gear flag 672, closing the shifter exhaust valves 673, and disabling the shifter vibrator motor 46 by setting the vibrator level to 0 674.

A check is then made as to whether the gear shift 26 is in neutral 675. If in neutral, the In-Gear flag is cleared 677. Otherwise, a check is made as to whether the clutch pedal 29 is depressed 676. If the clutch is depressed 676, the In-Gear flag is set 678. The effect of the preceding is to require that the clutch pedal 29 be depressed before the simulator S can be put in gear. Note however that it is possible to shift out of gear without clutching.

Regardless of whether or not the In-Gear flag is set or cleared, the clutch pedal 29 is again checked 679. If the pedal is depressed, the shifter exhaust valves are opened 681. Otherwise, the valves are closed 680. Opening the shifter exhaust valves when the clutch 29 is depressed releases the resistance placed on the gear shift 26, allowing the gear shift to move freely. This allows the simulator S to simulate the interaction in a truck between the clutch pedal and the gear shift. The gear shift can only be easily shifted when the clutch pedal is depressed.

A test is then made as to whether the clutch pedal 29 is depressed 601 or the In-Gear flag is clear 602. In either of the above situations, the shifter vibrator level is set to zero 610, turning off the vibrator motor 46. Otherwise, if in low range 603 and low split 604, the shifter vibrator motor level is set to 32. If in low range 603, but in high split 604, the shifter vibrator motor level is set to 64 607. If in high range 603 and low split 605, the shifter vibrator motor level is set to 96 606. Finally, if in high range 603 and high split 608, the shifter vibrator motor level is set to 128 608. This corresponds to the highest range, or approximately 10 volts input to the vibrator motor. Exit is then made 611.

The final PLC program is the road action program 504 of FIG. 7 which is illustrated in FIGS. 13A and 13B. Its purpose is to simulate the surface of an actual road. It does this by rocking forward, back, right, and left, depending on the surface of the road simulated. Note that the method outlined herein is only one possible way to simulate such road action. Other methods of simulating such road action will be obvious to one skilled in the art.

The road action program simulates road action by means of the four pods 40, 41, 42 and 43 located in the right front, left front, right rear, and left rear of the simulator S, as previously discussed. They are similar to the cylinders controlled by the remainder of the programming outlined above, with the exception that the "home" position of the pods is fully inflated, whereas the "home" position for the other cylinders is deflated. This means that pods are exhausted first, then reinflated to bring them back to the "home" state. This differs from the other cylinders where the cylinders are inflated first, then allowed to deflate to return to their "home" position.

There are two facets to programming road action. First, there is a method of encoding the action of a specific road. Secondly, there is a program that interprets the encoded road programs. The encoding will be disclosed first. The interpreting program, dependant upon the specific encoding scheme utilized, will be disclosed second.

Encoding a specific road is done using a two dimensional array. The array consists of pairs of cells, indexed from one to N by index variable "I". Each pair of cells consists of two cells, one (T(I)) contains the elapsed time that the state will exist. The second cell (V(I)) contains a value that indicates which of the four pods are to be exhausted during the corresponding elapsed time (T(I)). Each pod is assigned a power of two value. In the disclosed embodiment, the value of "1" indicates exhausting the right front pod, "2" the left front pod, "4" the right rear pod and a value of "8" indicates exhausting the left rear pod. These "power of two" values are logically added together to indicate which combination of pods to activate during the corresponding time period.

When a pod is determined to no longer require being exhausted, it is refilled for a predetermined time. A zero elapsed time (T(I)) value indicates the end of the encoded road action array. The road action interpreter program then repeats the encoded road action state from the beginning. Thus, the road simulated can be viewed as an infinite loop.

The encoding of a very simple road action is illustrated in FIG. 14. It is representative of what can be encoded. This encoding concerns a scenario where a truck, such as truck T, drives for 60 seconds across a level surface. In this scenario, the truck then ascends a hill for 30 seconds. The truck then drives levelly for 90 seconds across the top of the hill. Next, the truck descends for 40 seconds. Finally, the truck drives across a level surface for an additional 60 seconds.

The table in FIG. 14 illustrates the programming of the above road action scenario. The first entry in the table has a time of 60 seconds (T(1)). The value that corresponds to which pods to activate during that time is zero (V(1)), indicating that no pods are to be exhausted.

The second entry in the table has a time value of 30 seconds (T(2)) and a exhaust value of 12. This indicates that the right rear (value=4) and left rear (value=8) pods 42 and 43, respectively, are to be exhausted during that interval. This results in the platform rocking back during the prescribed period of time, simulating ascending a hill.

The third entry in the table has a time value of 90 seconds (T(3)) and a exhaust value (V(3)) equal to zero. This indicates that none of the four pods is active during that period of time, simulating the truck crossing the flat top of the hill. The fourth entry in the table has a time value of 40 seconds (V(4)), and an exhaust value (V(4)) equal to three (3). This indicates that during that 40 second interval, the two front pods 40 and 41 will be exhausted, allowing the front of the simulator S to drop, simulating descent of a hill. The final valid entry in the array consists of a time value (T(5)) of 60 seconds and a zero value for the cell that includes the pods to activate during that period of time. This is followed by a time value (T(6)) equal to zero. This value indicates the end of the encoding and that the encoded program is to be repeated.

The above disclosed method of encoding road action is only one of a number of methods equally obvious to one skilled in the relevant art.

The Road Action interpreter program 504 of FIG. 7 is entered 620 (FIG. 13A) and immediately makes a check as to whether this is the first time through the program 621 If the first time, initialization is performed. This consists of setting variables 622, turning off all pod input and exhaust switches 623 and disabling timers 1 and 2 624.

A check is then made as to whether Timer#1 is active 625. If the timer is not currently active, it started 627, and T1MAX and VNEW variables are set from T(I) and V(I) respectively 626. In either case, Timer#1 is updated to reflect the actual passage of time 628.

Timer#1 is then compared against T1MAX 629. If the Timer#1 value exceeds T1MAX, Timer#1 is disabled, Timer#2 is restarted, and the array index, "I" is incremented 630. If the T(I) entry is zero 631, the end of the encoded road action is indicated, and the encoded road action program is repeated by resetting the array index "I" to 1 632. In either case, T1MAX is set to T(I), VNEW is saved in VOLD, and VNEW is set to V(I) 633.

A check is then made as to whether Timer#2 is active 634. If the timer is active, it is updated 635 to reflect the actual passage of time. Timer#2 is then compared to T2MAX (a configured constant) 636. If Timer#2 exceeds T2MAX, Timer#2 is disabled, all input pods are closed, and VOLD is set to zero 637.

At this point, VNEW can be viewed as containing a binary encoded value that corresponds to the exhaust pod valves to open. VOLD contains a similarly encoded value that corresponds to intake pod valves to open. VOLD will either contain the previous time period's VNEW value, or zero, depending on whether Timer#2 is active or has expired.

VNEW is logically ANDed with 1, isolating the 20 bit (value="1"), which corresponds to the right front Pod valve. If this bit is set 638 (FIG. 13B), the front right pod 40 exhaust valve 192 is opened 639 and the right front pod intake valve 188 is closed 640. If the bit is not set in VNEW 638, it is checked in the VOLD variable 641. If the 20 bit is set in VOLD, the right front pod exhaust valve 192 is closed 642, and the right front pod intake valve 188 is opened 643.

Corresponding VNEW and VOLD checks are made for the 21 bit (value="2"), corresponding to the left front pod 41, the 22 bit (value="4"), corresponding to the right rear pod 42, and the 2**3 bit (value="8"), corresponding to the left rear pod 43. The corresponding exhaust and intake valves are opened or closed, depending on the appropriate VNEW and VOLD values found. After the bits for the four pods have been checked, the program exits 662.

This device, as described, and its method of use shows promise of being of considerable value to society, both in aiding patients to return to their job after injury rehabilitation and in determining with accuracy and finality their need to find another occupation. A decrease in worker's compensation cost should result through more rapid resolution of cases and by screening out potential claims. This device has the potential in the research field of medicine and ergonomics of helping to determine more clearly the adverse effects of the exposure of the human body to sustained vibration and to hopefully determine better ways to reduce these effects within the jobs where they exist.

Although the present invention has been described as a simulator for vehicles, it should be understood that it can be used to simulate any work environment where the worker sits in a seat and experiences various work loads and vibrations which can be simulated. This invention also has application to simulation in a vehicle in which the driver stands up.

This invention has been described in detail with reference to a particular embodiment thereof, but it will be understood that various other modifications can be effected within the spirit and scope of this invention.

We claim:

1. Apparatus for simulating the vibrations and other physical responses experienced by a driver of a vehicle, said apparatus comprising:

a simulator having a frame supporting a seat and vehicle controls which include a gear shift, an accelerator pedal, brake pedal, clutch pedal and steering wheel, each of said controls selectively providing signals in response to operation of each said controls;

a base upon which said frame is spring mounted for movement about an X axis, a Y axis and a Z axis, said base having four corners and an inflatable pod attached to each corner of said base for raising said base above the ground during operation of said simulator;

cylinder means interconnected between said base and said frame to cause selected movements about said axes, said cylinder means including a front cylinder, a back cylinder, a left cylinder and a right cylinder;

a first electric vibrator motor connected to said frame;

means connected to said first electric vibrator motor responsive to signals in response to movement of said gear shift to simulate the vibrations associate with shifting a vehicle;

a second electric vibrator motor connected to said frame;

a variable resistor responsive to movement of said accelerator pedal to provide a signal to said second electric vibrator motor to simulate the vibrations associated with the vehicle engine during acceleration;

an accelerator operated variable resistor provides a variable signal for controlling expansion and contraction of said front cylinder in response to movement of said accelerator pedal;

a clutch pedal proximity switch providing a signal said clutch pedal is depressed;

brake pedal proximity switches providing signals for controlling expansion and contraction of said back cylinder in response to depression and releasing of said brake pedal; and a steering wheel variable resistor of providing signals for controlling selective deflation of said pods to tilt said simulator about said X axis in response to turning said steering wheel.

2. Apparatus, as claimed in claim 1, further including:

a pinion mounted for rotation with said steering wheel; and a first and second rack in engagement with and movable with said pinion upon rotation thereof by said steering wheel; and first and second pneumatic cylinders providing resistance to move movement of said racks when said steering wheel is turned.

3. Apparatus, as claimed in claim 1, further including:

a programmed logic controller on said simulator; and a computer program generated from responses of an actual vehicle traversing a road for a given time period, said computer program being inputed to said programmed logic controller for providing signals to said control panel to generate said output signals.

4. Apparatus, as claimed in claim 3, further including:

means for providing manual inputs to said programmed logic controller to override said computer program.

5. Apparatus, as claimed in claim 4, further including:

an audio/video display connected to said programmed logic controller responsive to signals from said computer program to reproduce sounds and images generated when the vehicle traversed the road.

6. Programmable apparatus for simulating the travel of a vehicle over a selected road course comprising:

a vehicle simulator having a base;

a platform above and mounted to move relative to said base;

a seat mounted on the platform;

a plurality of user-actuated input devices used to operate the vehicle mounted on said platform including, a steering wheel having first transducer means to convert mechanical movement to a corresponding electrical signal;

a brake pedal having proximity switches to convert mechanical movement to a corresponding electrical signal;

an accelerator pedal having second transducer means to convert mechanical movement to a corresponding electrical signal; and a gear shift having magnetic sensor means to create a electrical signal when the gear shift is in the neutral position;

a plurality of different selected load devices arranged to impart selected travel simulator movements to said platform including front, rear, left, and right two-way cylinders arranged to move the platform at associated positions, each said cylinder having an electrically operated solenoid valve to control fluid input and fluid exhaust;

front, left and right and rear left and right pods between said base and the ground, each said pod having a pod solenoid valve to control fluid input and fluid exhaust;

a two-way gear shift cylinder arranged to move the platform at associated positions, said gear shift cylinder having a gear shift solenoid valve to control fluid input and fluid exhaust;

a first vibrator motor arranged to selectively vibrate said platform to simulate engine vibration;

a second vibrator motor arranged to selectively vibrate said platform to simulate road vibration;

a programmable logic controller having a plurality of input terminals and a plurality of output terminals coupled between said input devices and said load devices, said input terminals receiving input signals from said input devices, said output terminals applying output signals to said load devices, said controller being programmed to operate in a sequence of operational steps to cause said platform to move as if an operator seated on said seat were actuating said input devices as if driving along a selected road course.

* * * * *